US005458220A

United States Patent [19]

Nguyen et al.

[11] Patent Number: 5,458,220

[45] Date of Patent: Oct. 17, 1995

[54] BALUSTRADE FOR A PASSENGER CONVEYOR

[75] Inventors: Dat Nguyen, West Hartford; James Rivera, Bristol; Dale Barrett, Berlin, all of Conn.

[73] Assignee: Otis Elevator Company, Farmington, Conn.

[21] Appl. No.: 269,590

[22] Filed: Jul. 1, 1994

[51] Int. Cl.$^6$ .......... B65G 15/00

[52] U.S. Cl. .......... 198/335

[58] Field of Search .......... 198/335, 326; 52/208, 584.1

[56] References Cited

U.S. PATENT DOCUMENTS

| | | | |
|---|---|---|---|
| 1,956,155 | 4/1934 | Lindquist et al. | 198/335 |
| 2,058,379 | 10/1936 | Handy et al. | 198/335 |
| 2,193,583 | 3/1940 | Dunlop | 198/326 |
| 4,646,907 | 3/1987 | Streibig et al. | 198/335 |
| 4,690,264 | 9/1987 | Adrian et al. | 198/335 |
| 4,819,781 | 4/1989 | Saito et al. | 198/335 |
| 4,953,686 | 9/1990 | Rulke | 198/335 |
| 5,156,251 | 10/1992 | Johnson | 198/335 |
| 5,205,391 | 4/1993 | Nurnberg et al. | 198/325 |
| 5,215,177 | 6/1993 | Johnson et al. | 198/335 |
| 5,284,237 | 2/1994 | Mello et al. | 198/335 |

FOREIGN PATENT DOCUMENTS

| | | | |
|---|---|---|---|
| 1122527 | 2/1967 | United Kingdom | B66B 9/12 |

*Primary Examiner*—Joseph E. Valenza

[57] ABSTRACT

A balustrade for a passenger conveying device is provided comprising a handrail, a plurality of balustrade panels, a base, and a clamp. The balustrade panels support the handrail. The base includes a skirt panel, apparatus for supporting the balustrade panels, and an inner decking for enclosing a portion of the support apparatus. The clamp, which includes a fastener and a biasing apparatus, attaches the inner decking to the skirt panel.

6 Claims, 2 Drawing Sheets

BALUSTRADE FOR A PASSENGER CONVEYOR

BACKGROUND OF THE INVENTION

1. Technical Field

This invention relates to passenger conveying devices in general, and to balustrades for passenger conveying devices in particular.

2. Background Information

Escalators, moving walkways, and other passenger conveying devices efficiently move a large volume of pedestrian traffic from one point to another. Passengers step on moving steps (or belts, or pallets) and are transported along at a constant rate of speed. For safety reasons, passenger handrails are provided, traveling in the same direction and speed as the steps. A balustrade supports and guides one of the handrails on each side of the steps. Each balustrade includes balustrade panels (typically glass) which extend up from a base to support the handrail. Externally, the base consists of a number of enclosure panels including an outer decking, an inner decking, and a skirt panel. The outer decking encloses the mechanics on the side of the balustrade panel opposite the moving steps. The inner decking and skirt panel enclose the mechanics adjacent the moving steps.

It is known in the art that a desirable balustrade design must provide a rigid structure which supports the balustrades panel and prevents the public from accessing the balustrade mechanics and moving handrail within. However, a desirable balustrade must also allow access to the enclosed mechanics, must be easily manufactured and assembled, and must be as inexpensive as possible.

The joint between the inner decking and the skirt panel, for example, must be rigid and yet still be easily assembled or disassembled. It is known in the art to drill the inner decking and skirt panel, and tap the skirt panel at assembly for receiving the fasteners. It is also known in the art to include a plurality of slots in a flange attached to and extending up from the skirt panel which tucks behind the inner decking. During assembly, fasteners inserted through holes in the inner decking are received within the slots formed in the skirt panel flange. A disadvantage of both these solutions is that drilling at assembly is labor intensive and increases the potential for error. Another disadvantage is that holes drilled for the original panels may not align with the holes or slots in replacement pans. Still another disadvantage of the slot approach is that the positional adjustability of the skirt panel in the best case is limited to the dimensions of the slots. In the worst case, the skirt panel may not be adjustable at all relative to the inner decking, depending on where the fasteners lie within the slots.

DISCLOSURE OF THE INVENTION

An object of the present invention is to provide a balustrade for a passenger conveying device that permits easy access to the mechanics enclosed therein.

A further object of the present invention is to provide a durable balustrade for a passenger conveying device.

A still further object of tile present invention is to provide a balustrade for a passenger conveying device that minimizes vibrational noise.

A still further object of the present invention is to provide a balustrade for a passenger conveying device that facilitates assembly.

According to the present invention, a balustrade for a passenger conveying device is provided comprising a handrail, a plurality of balustrade panels, a base, and a clamp. The balustrade panels support the handrail. The base includes a skirt panel, means for supporting the balustrade panels, and an inner decking for enclosing a portion of the support means. The clamp, which includes a fastener and a biasing means, attaches the inner decking to the skirt panel.

According to one aspect of the present invention, the amount of force biasing the inner decking and the skirt panel together by the biasing means is adjustable.

According to another aspect of the present invention, a panel lock is provided to prevent the skirt panel from detaching from the inner decking.

An advantage of the present invention is that the balustrade permits easy access to the mechanics enclosed therein.

Another advantage of the present invention is that fastener alignment between the skirt panel and the inner decking is greatly facilitated. A person of skill in the art will recognize that at present it is common for skirt panels to have slots for alignment with fasteners attached to the inner decking. Alternatively, it is common for skirt panels and inner deckings to be drilled and fastened at assembly. Either way, alignment problems can occur at some point along the balustrade during assembly or later if balustrade sections are replaced. The present invention, in contrast, only requires that the skirt panel edge be placed between the biasing means and the inner decking.

Still another advantage of the present invention is that vibrational noise emanating from the connection between the skirt panel and the inner decking is minimized or eliminated. It is not uncommon for conventionally fastened skirt panels and inner deckings, or those biased against one another only by a spring clip, to vibrate relative to one another and cause undesirable noise. Moreover, clips that simply hold the skirt panel and inner decking together do not always provide a uniform force. As the clips wear, the discontinuity in clip force can erode still further. The present invention, in contrast, provides a fastener and a biasing means for biasing the skirt panel and inner decking together which may be adjusted. Torquing the biasing means down with the fastener causes the biasing means to lock the fastener.

These and other objects, features and advantages of the present invention will become more apparent in light of the detailed description of the best mode embodiment, thereof, as illustrated in the accompanying drawings.

DETAILED DESCRIPTION OF THE DRAWINGS

BEST MODE FOR CARRYING OUT THE INVENTION

Figure 1:
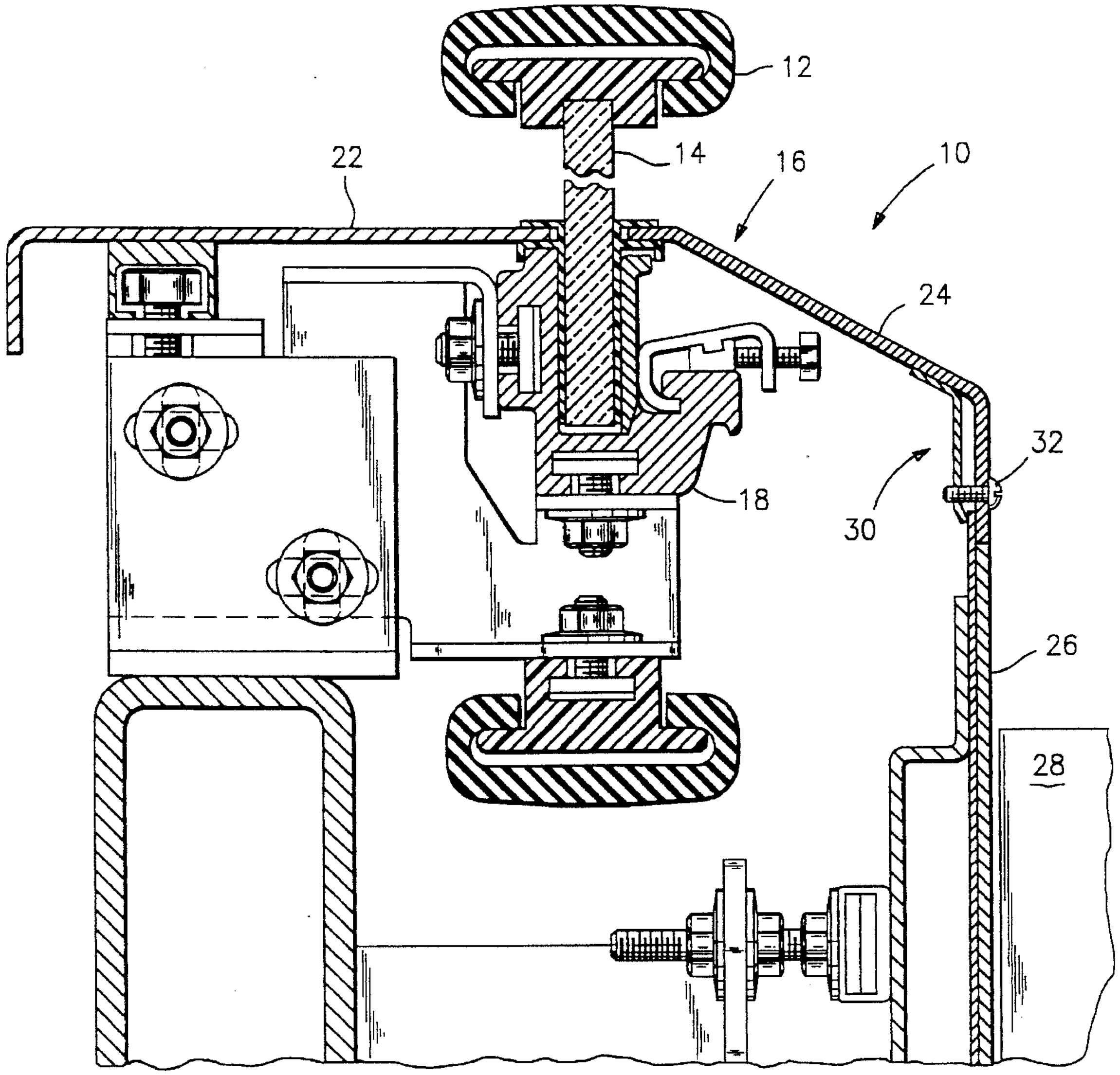
FIG. 1 is a cross-sectional view of a balustrade for a passenger conveyor.

Referring to FIG. 1, a balustrade 10 for a passenger conveying device includes a handrail 12, balustrade panels 14, and a base 16. The handrail 12 travels a circuitous path from one end of the passenger conveyor to the other end, as is known in the art. The balustrade panels 14 extend up from the base 16 to support and guide the handrail 12 in the exposed portion of the handrail path.

The base 14 includes a panel holder 18 for supporting the balustrade panels 14 (typically glass) and a plurality of enclosure panels 20. The enclosure panels 20 include an outer decking 22, an inner decking 24, and a skirt panel 26. The outer decking 22 encloses the mechanics on the side of the balustrade panels 14 opposite the moving steps 28 (or treadplates, or pallets, etc.). The inner decking 24 and skirt panel 26 enclose the mechanics adjacent the moving steps 28.

Figure 2:
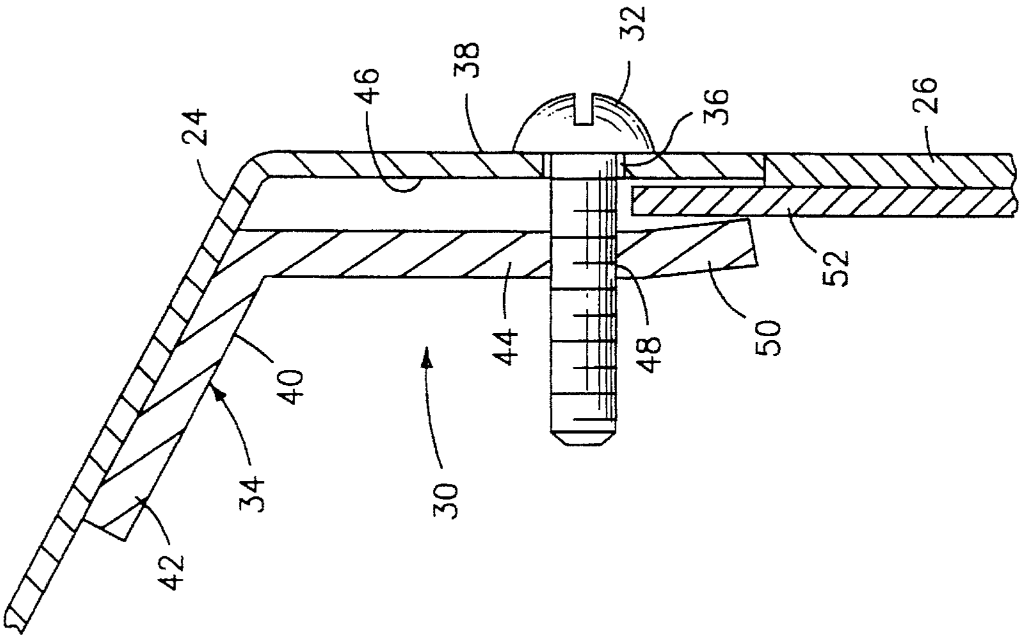
FIG. 2 is a enlarged view of the joint between skirt panel and inner decking shown in FIG. 1.

Referring to FIG. 2, the inner decking 24 and skirt panel 26 are attached to one another by a clamp 30. The clamp 30 includes at least one fastener 32 and a biasing means 34. In the preferred embodiment, the inner decking 24 includes a plurality of holes 36 spaced along the lower edge 38 of the inner decking 24, for receiving the fasteners 32. In a first embodiment, the biasing means 34 comprises a wedge clip 40 having a first arm 42 and a second arm 44. The arms 42, 44 are arranged such that the second arm 44 is spaced away from the inner surface 46 of the inner decking 24. The second arm 44 includes a plurality of threaded holes 48 for receiving the fasteners 32. The holes 48 in the second arm 44 are spaced to match the holes 36 in the inner decking 24. The outer edge of the second arm 44 may include a tip 50 slightly bent in the direction of the inner decking 24 which, when assembled with the inner decking 24, creates a smaller contact area for clamping a flange 52 extending up from, and attached to, the skirt panel 26. The skirt panel flange 52 fits between the second arm 44 and the inside surface 46 of the inner decking 24. Tightening the fastener 32 causes the second arm 44 to clamp down on the skirt panel flange 52, thereby fixing the position of the skirt panel 26 relative to the inner decking 24. The cantilevered shape of the wedge clip 40 causes the clip 40 to act like a leaf spring and lock the fastener 32 in place. The clamping force of the clip 40 may be adjusted by tightening the fastener 32.

Figure 3:
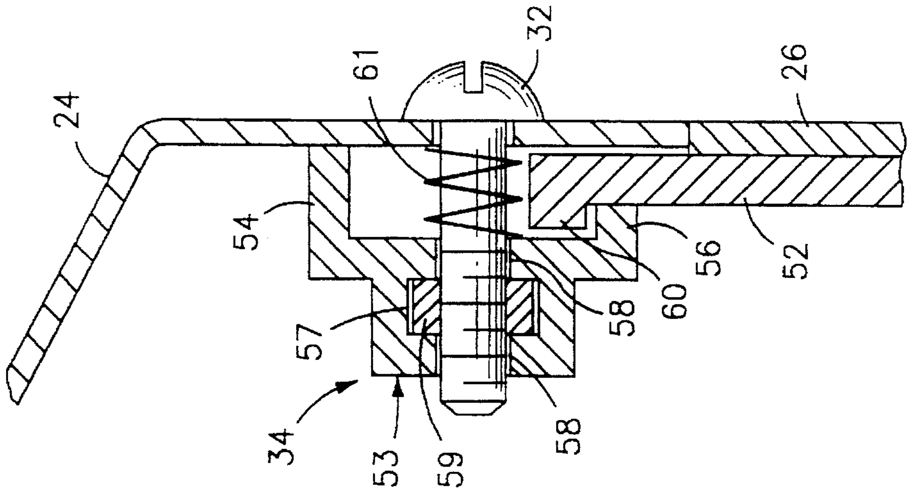
FIG. 3 is an alternative embodiment of the joint between the skirt panel and inner decking shown in FIG. 1.

Referring to FIG. 3, in a second embodiment the biasing means 34 comprises a generally "U"-shaped member 53, having a first 54 and second 56 leg. A "C"-shaped channel 57, having holes 58 for receiving the fasteners 32, is formed in the member 53 between the two legs 54, 56. Nuts 59 are positioned within the channel 57 to receive the fasteners 32. The geometry of the channel 57 prevents the nuts 59 from rotating when the fastener 32 is being tightened. Alternatively, threaded holes 58 for receiving the fasteners 32 may be located between the two legs 54, 56, spaced to match the holes 36 in the inner decking 24. The second leg 56 is shorter than the first 54 by an amount approximately equal to the thickness of the skirt panel flange 52. When the member 53 is assembled with the inner decking 24, the second leg 56 is positioned adjacent the skirt panel 24. The skirt panel flange 52 fits between the second leg 56 and the inside surface 46 of the inner decking 24. A spring 61 biases the member 53 away from the inner decking 24 to facilitate assembly. Tightening the fastener 32 causes the second leg 56 to clamp down on the skirt panel flange 52, thereby fixing the position of the skirt panel 26 and to the inner decking 24 relative to one another. The "U"-shape of the member 53 causes the member to act like a spring and lock the fastener 32 in place. Here again, the clamping force of the clip 40 may be adjusted by tightening the fastener 32. After the fastener 32 and member 53 are assembled, the end of the fastener 32 is peened to prevent the fastener from being drawn all the way out.

In either embodiment, the flange 52 on the skirt panel 26 may include a tab 60 that mates with biasing means 34 to aid in the assembly of the balustrade 10 by holding the skirt panel 26 in place without having to tightly clamp the skirt panel 26. The tab 60 also prevents the skirt panel 26 from detaching from the inner decking 24 in the event that the flange 52 somehow comes loose while the device is in operation. The skirt panel flange 52 shown in FIG. 3, for example, includes a tab 60 that locks the skirt panel 26 and the inner decking 24 together. A person of skill in the art will recognize that a variety of geometries between the biasing means 34 and the skirt panel flange 52 may be used alternatively.

The clamping arrangement of the present invention allows the entire skirt panel and inner decking 26 to "float" relative to one another because there are no fasteners 32 that directly contact the skirt panel flange 52. A person of skill in the art will recognize that this feature greatly facilitates the skirt panel 26 installation and alignment process.

Although this invention has been shown and described with respect to the detailed embodiments thereof, it will be understood by those skilled in the art that various changes in form and detail thereof may be made without departing from the spirit and scope of the claimed invention. For example, the biasing means may extend the entire length of one or more skirt panels, or alternatively may comprise several smaller lengths per skirt panel.

We claim:

1. A balustrade for a passenger conveying device, comprising:

a handrail;

a plurality of balustrade panels, for supporting said handrail;

a base, having means for supporting said balustrade panels and an inner decking for enclosing a portion of said support means;

a skirt panel; and a clamp, for attaching said inner decking to said skirt panel, said clamp comprising a fastener and a biasing means, said biasing means including a spring member capable of generating a spring force upon deflection of said spring member;

wherein said fastener attaches said biasing means to one of said inner decking or said skirt panel such that said spring member deflects, and whereby said biasing means biases said inner decking and said skirt panel together.

2. A balustrade for a passenger conveying device according to claim 1, wherein the amount of spring force biasing said inner decking and said skirt panel together by said biasing means may be adjusted by said fastener.

3. A balustrade for a passenger conveying device according to claim 1, wherein said biasing means comprises a cantilevered arm having a threaded aperture for receiving the fastener, said cantilevered arm including a tip bent in the direction of said inner decking to define said spring member.

4. A balustrade for a passenger conveying device according to claim 3, wherein the amount of spring force biasing said inner decking and said skirt panel together by said biasing means may be adjusted by said fastener.

5. A balustrade for a passenger conveying device according to claim 4, further comprising a panel lock, wherein said panel lock prevents said skirt panel from detaching from said inner decking, said panel lock being disengaged by removal of said fastener.

6. A balustrade for a passenger conveying device according to claim 5, wherein panel lock includes a first tab attached to said skirt panel and a second tab attached to said cantilevered arm, wherein said tabs cooperate to prevent said skirt panel from being detached from said inner decking, and wherein removal of said fastener causes said tabs to separate and permit said skirt panel to detach from said inner decking.

* * * * *